United States Patent
Harada et al.

(10) Patent No.: US 10,501,075 B2
(45) Date of Patent: Dec. 10, 2019

(54) VEHICULAR BRAKING/DRIVING-FORCE CONTROL APPARATUS

(71) Applicant: TOYOTA JIDOSHA KABUSHIKI KAISHA, Toyota-shi, Aichi (JP)

(72) Inventors: Hiroshi Harada, Nagakute (JP); Naoki Taki, Okazaki (JP); Masaaki Uechi, Nagoya (JP); Kumiko Kondo, Nisshin (JP); Hideaki Hayashi, Toyota (JP); Akio Kimura, Toyota (JP); Atsutoshi Sakaguchi, Toyota (JP); Toshifumi Kawasaki, Toyota (JP); Tomohiko Futatsugi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/109,534

(22) PCT Filed: Sep. 18, 2015

(86) PCT No.: PCT/JP2015/004809
§ 371 (c)(1),
(2) Date: Jul. 1, 2016

(87) PCT Pub. No.: WO2016/059753
PCT Pub. Date: Apr. 21, 2016

(65) Prior Publication Data
US 2018/0043885 A1    Feb. 15, 2018

(30) Foreign Application Priority Data
Oct. 17, 2014   (JP) ................... 2014-212686

(51) Int. Cl.
*B60W 30/09*  (2012.01)
*B60T 8/175*  (2006.01)
(Continued)

(52) U.S. Cl.
CPC ............ *B60W 30/09* (2013.01); *B60T 7/22* (2013.01); *B60T 8/175* (2013.01); *B60W 10/18* (2013.01);
(Continued)

(58) Field of Classification Search
USPC .......................................... 701/79
See application file for complete search history.

(56) References Cited

U.S. PATENT DOCUMENTS 6,233,515 B1 *   5/2001   Engelman ........... B60K 31/0008
                                                          180/169
6,358,182 B1 *   3/2002   Eguchi ................... B60K 6/543
                                                          477/171
(Continued)

FOREIGN PATENT DOCUMENTS

DE   2004-814902    *  5/2003
EP   2003-259318    *  3/2003
(Continued)

OTHER PUBLICATIONS

Carsten, Oliver et al., "Isa—UK intellegent speed adaptation: Final Report" The University of Leeds and Mira Ltd., Jun. 2008.

*Primary Examiner* — Jean Paul Cass
(74) *Attorney, Agent, or Firm* — Oliff PLC (57) ABSTRACT

A vehicular braking/driving-force control apparatus includes an accelerator operation detection part configured to detect an accelerator operation; a driving-force limiting apparatus configured to carry out driving-force limiting control of limiting driving force of an own vehicle in such a manner that an upper-limit speed that is set will not be exceeded; an automatic braking control apparatus configured to carry out automatic braking control of automatically generating braking force in the own vehicle based on a relative distance or a relative speed between an obstacle in front of the own vehicle and the own vehicle, and have a cancellation func- (Continued)

tion of inhibiting a start of the automatic braking control based on the accelerator operation; and a control part configured to inhibit the cancellation function from being executed when the driving-force limiting apparatus is in an activated state where the driving-force limiting apparatus is allowed to carry out the driving-force limiting control.

16 Claims, 7 Drawing Sheets

(51) Int. Cl.
*B60W 10/18* (2012.01)
*B60W 30/14* (2006.01)
*B60T 7/22* (2006.01)

(52) U.S. Cl.
CPC ...... *B60W 30/146* (2013.01); *B60T 2201/022* (2013.01); *B60W 2540/10* (2013.01); *B60W 2720/10* (2013.01)

(56) References Cited

U.S. PATENT DOCUMENTS

| | | | | |
|---|---|---|---|---|
| 6,488,109 | B1* | 12/2002 | Igaki | B60T 8/17557 180/169 |
| 7,561,954 | B2* | 7/2009 | Aizawa | B60K 31/00 180/170 |
| 8,676,466 | B2* | 3/2014 | Mudalige | G08G 1/22 370/252 |
| 9,493,160 | B2* | 11/2016 | Kelly | B60K 31/02 |
| 9,701,292 | B2* | 7/2017 | Fairgrieve | B60K 31/02 |
| 9,702,349 | B2* | 7/2017 | Anderson | B60G 17/019 |
| 9,932,034 | B2* | 4/2018 | Woodley | B60T 17/221 |
| 10,173,678 | B2* | 1/2019 | Woodley | B60W 10/06 |
| 2007/0145818 | A1 | 6/2007 | Kobayashi et al. | |

FOREIGN PATENT DOCUMENTS

| | | | |
|---|---|---|---|
| GB | 2013-L69771 | * | 10/2013 |
| JP | 2007-191134 A | | 8/2007 |
| JP | 2010-006334 A | | 1/2010 |

* cited by examiner

VEHICULAR BRAKING/DRIVING-FORCE CONTROL APPARATUS

TECHNICAL FIELD

The present disclosure relates to a vehicular braking/driving-force control apparatus.

BACKGROUND ART

A vehicular driving operation assistance apparatus is known, which, based on an allowance period of time between an own vehicle and a front obstacle, calculates a risk potential of the own vehicle, and increases braking force more as the risk potential becomes greater (for example, see Japanese Laid-Open Patent Application No. 2007-191134). The vehicular driving operation assistance apparatus does not increase the braking force when detecting the driver's intention to perform acceleration.

Also, driving-force limiting control is known, which limits driving force in a vehicle in such a manner that an upper-limit speed that is set will not be exceeded (for example, see "Isa—UK intelligent speed adaptation: Final Report, the University of Leeds and MIRA Ltd, June 2008").

SUMMARY OF INVENTION

According to one aspect of the present invention, a vehicular braking/driving-force control apparatus includes an accelerator operation detection part configured to detect an accelerator operation; a driving-force limiting apparatus configured to carry out driving-force limiting control of limiting driving force of an own vehicle in such a manner that an upper-limit speed that is set will not be exceeded; an automatic braking control apparatus configured to carry out automatic braking control of automatically generating braking force in the own vehicle at least based on a relative distance or a relative speed between an obstacle in front of the own vehicle and the own vehicle, and have a cancellation function of inhibiting a start of the automatic braking control based on the accelerator operation; and a control part configured to inhibit the cancellation function from being executed when the driving-force limiting apparatus is in an activated state where the driving-force limiting apparatus is allowed to carry out the driving-force limiting control.

Other objects, features and advantages of the present invention will become more apparent from the following detailed description when read in conjunction with the accompanying drawings.

DESCRIPTION OF EMBODIMENTS

The above-mentioned driving-force limiting control is control for limiting the driving force in a vehicle in such a manner that an upper-limit speed that is set will not be exceeded. Therefore, under the condition where the driving-force limiting control is being executed, the driving force may be limited even when the driver steps on the accelerator pedal. Therefore, under the condition where the driving-force limiting control is being executed, an accelerator operation may not precisely represent the driver's acceleration intention. Therefore, in such a configuration that a start of automatic braking control is inhibited based on an accelerator operation, there is a likelihood that the automatic braking control is not started although the driver does not have acceleration intention, under the condition where the driving-force limiting control is being executed.

Therefore, according to the present disclosure, an object is to provide a vehicular braking/driving-force control apparatus for reducing a likelihood that automatic braking control is not started due to an accelerator operation although the driver has no acceleration intention under the condition where the driving-force limiting control is being executed.

Below, with reference to the accompanying drawings, each embodiment will be described in detail.

Figure 1:
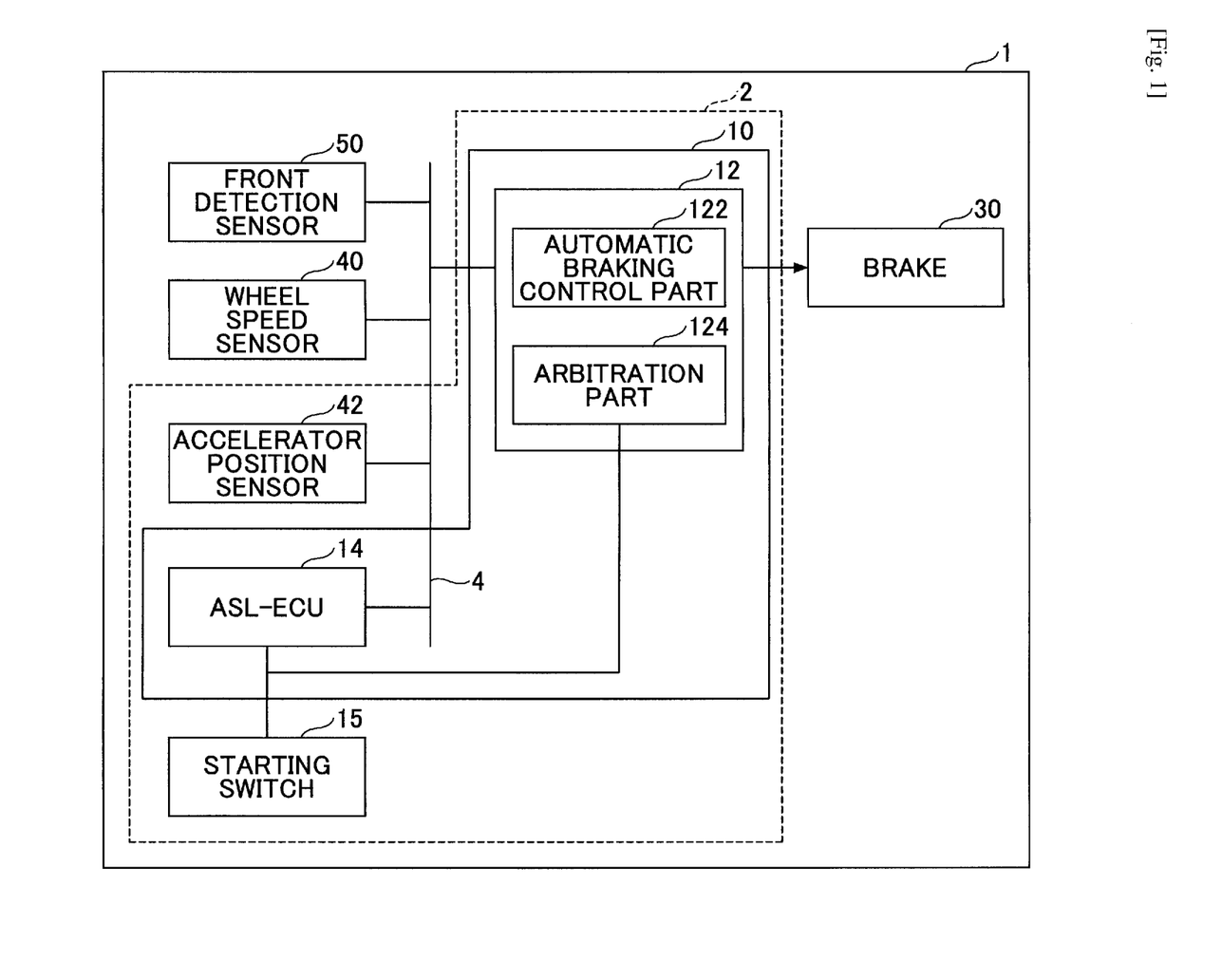
FIG. 1 is a system configuration diagram generally illustrating one example of a vehicle system 1.

FIG. 1 is a system configuration diagram generally illustrating one example of a vehicle system 1.

The vehicle system 1 includes a vehicular braking/driving-force control apparatus 2, a starting switch 15, a brake 30, a wheel speed sensor 40, and a front detection sensor 50. The vehicular braking/driving-force control apparatus 2 includes a control apparatus 10 and an accelerator position sensor 42.

The control apparatus 10 can include a processor such as a microcomputer. The functions of the control apparatus 10 can be implemented by any hardware, software, firmware or any combination thereof. The control apparatus 10 can be implemented by a plurality of processors.

In the example shown in FIG. 1, the control apparatus 10 includes a Pre-Crash Safety (PCS)-ECU 12, and an Adjustable Speed Limiter (ASL)-ECU 14. The PCS-ECU 12 includes an automatic braking control part 122, and an arbitration part (one example of a control part) 124. Note that, the division between the automatic braking control part 122 and the arbitration part 124 is a virtual one, and, for example, a program implementing the automatic braking control part 122 may include all or part of a program implementing the arbitration part 124. Also, all or part of a program implementing the automatic braking control part 122 may be included in a program implementing the arbitration part 124.

Note that, in the example shown in FIG. 1, the PCS-ECU 12 is connected with the ASL-ECU 14 and so forth via a controller area network (CAN) 4. However, a specific way (s) of connecting the respective elements shown in FIG. 1 can be any way. For example, the specific way of connecting can be a way using a bus such as a CAN, can be an indirect way using another ECU or so, can be a direct way using a direct connection (a direct line), or can be a way enabling radio communication.

The automatic braking control part 122 executes automatic braking control of automatically generating the braking force in the vehicle based on a relationship between an obstacle in front of the own vehicle (hereinafter, simply referred to as a "front obstacle") and the own vehicle. The automatic braking control means, for example, control where, under the condition where the driver does not step on a brake pedal (not shown) or under the condition where the driver operates the brake pedal by a small operation amount, the wheel pressure in the wheel cylinder is increased. For example, the automatic braking control part 122 determines an automatic braking control start condition based on information from the front detection sensor 50. When determining that the automatic braking control start condition is satisfied, the automatic braking control part 122 outputs an automatic braking control request to an Electronic Control Unit (ECU) of the brake 30. The automatic braking control start condition is any condition. For example, in collision avoidance control against a front obstacle, the automatic braking control part 122 calculates a Time to Collision (TTC) until a collision with the front obstacle will occur, and the automatic braking control start condition can be one satisfied when the calculated TTC becomes less than a predetermined value (for example, one second). In this case, the automatic braking control part 122 calculates, based on the detection result of the front detection sensor 50, the TTC for the front obstacle in a predetermined area in a lateral direction, and determines that the automatic braking control start condition is satisfied when the calculated TTC becomes less than a predetermined value (for example, 0.8 seconds). Note that, the TTC can be derived from dividing the relative distance to the front obstacle by the relative speed to the front obstacle.

Under the condition where the ASL-ECU 14 is not executing driving-force limiting control, the arbitration part 124 inhibits a start of automatic braking control otherwise carried out by the automatic braking control part 122 based on accelerator position information, in a state where the accelerator position indicated by accelerator position information is greater than or equal to a first threshold Acc1 indicating the driver's acceleration intention. It is possible that the first threshold Acc1 corresponds to any value (for example, a lower-limit value) within a range of the accelerator position indicating the driver's acceleration intention in the own vehicle, and is adapted, for example, within a range between 75% and 95%. Hereinafter, a function of inhibiting a start of the automatic braking control otherwise carried out by the automatic braking control part 122 based on the accelerator position information indicating the accelerator position greater than or equal to the first threshold Acc1 will be referred to as a "cancellation function". On the other hand, the arbitration part 124 inhibits execution of the cancellation function under the condition where the ASL-ECU 14 is executing the driving-force limiting control. Details of the functions of the arbitration part 124 will be described later. The condition where the ASL-ECU 14 is executing the driving-force limiting control does not include a condition where the ASL-ECU 14 is not executing the driving-force limiting control while the ASL-ECU 14 is in an activated state. For example, the condition where the ASL-ECU 14 is executing the driving-force limiting control means a condition where not only the ASL-ECU 14 is in an activated state but also the driving force is actually limited. The condition where the driving force is actually limited means, for example, a condition where, due to the ASL-ECU 14, the driving force less than the driving force requested by the driver is generated, a condition where, although the driving force requested by the driver is greater than 0, no driving force is generated due to the ASL-ECU 14.

The ASL-ECU 14 executes the driving-force limiting control of limiting the driving force of the own vehicle in such a manner that an upper-limit speed that is set will not be exceeded. The ASL-ECU 14 is started and is activated when the starting switch 15 is turned on. In the activated state, the ASL-ECU 14 calculates the upper-limit acceleration corresponding to the upper-limit speed, for example, based on the upper-limit speed information, the vehicle speed information, and/or the like. For example, the upper-limit acceleration can be calculated as such acceleration that the vehicle speed will not exceed the upper-limit speed at the acceleration, based on the difference between the upper-limit speed and the current vehicle speed. Therefore, basically, the upper-limit acceleration can have such a value that the greater the difference between the upper-limit speed and the current vehicle speed becomes, the greater the upper-limit acceleration becomes. The ASL-ECU 14 calculates the upper-limit driving force based on the upper-limit acceleration. At this time, the upper-limit driving force can be calculated in consideration of the road slope, the travel resistance, and/or the like. The ASL-ECU 14 executes the driving-force limiting control when the required driving force calculated from the accelerator position is greater than the upper-limit driving force. That is, for example, the ASL-ECU 14 controls the engine via an engine ECU (not shown) in such a manner that the required driving force will be limited to the upper-limit driving force and the upper-limit driving force will be realized. Note that, instead of or in addition to the engine, a travelling electric motor can be controlled. At this time, the upper-limit driving force can be controlled in a feedback manner based on the current acceleration and the upper-limit acceleration.

The starting switch 15 is connected with the ASL-ECU 14. The starting switch 15 is operated by a user. The starting switch 15 is operated into a turned-on position by the user when a driving-force limiting control function is to be turned on, and is operated into a turned-off position by the user when the driving-force limiting control function is to be turned off.

The brake 30 includes the ECU (not shown) and an oil-hydraulic circuit (not shown), and generates the braking force in response to an automatic braking control request from the automatic braking control part 122. A specific configuration of the oil-hydraulic circuit of the brake 30 can be any configuration as long as it can implement the automatic braking control. For example, the oil-hydraulic circuit of the brake 30 includes a pump(s), an accumulator(s), and/or the like, generating high-pressure oil. It is possible that while the automatic braking control is being executed, various valves such as a master cylinder cut solenoid valve (s), the pump(s), and/or the like, are controlled, and thus, the wheel cylinder pressure in the wheel cylinder is increased. It is also possible that the oil-hydraulic circuit of the brake 30 has a circuit configuration such as that used in a brake-by-wire system typified by Electric Control Braking (ECB).

The wheel speed sensor 40 detects the rotational speed of the wheel. The wheel speed sensor 40 is installed at, for example, each of the wheels of the vehicle.

The accelerator position sensor 42 detects the accelerator position (the amount of stepping on the accelerator pedal). The accelerator position sensor 42 supplies the information (accelerator position information) indicating the detection result of the accelerator position to the control apparatus 10.

The front detection sensor 50 determines the information (that is, information indicating a relationship between the front obstacle and the own vehicle) to be used in the automatic braking control executed by the automatic braking control part 122. For example, the front detection sensor 50 detects the state of the front obstacle (typically, the front vehicle) using electromagnetic waves (for example, millimeter waves), light waves (for example, laser waves) or ultrasonic waves, as detection waves. The front detection sensor 50 determines the information indicating the relationship between the front obstacle and the own vehicle, for example, the relative speed, the relative distance, and/or the direction (lateral position) with respect to the own vehicle, in a predetermined cycle. The information indicating the relationship between the front obstacle and the own vehicle is transmitted to the automatic braking control part 122 in a predetermined cycle. Note that the functions of the front detection sensor 50 (for example, the function of calculating the position of the front obstacle) can be implemented by the automatic braking control part 122.

Note that, instead of or in addition to the front detection sensor 50, an image sensor can be used. The image sensor includes a camera including an imaging device such as a charge-coupled device (CCD), complementary metal oxide semiconductor (CMOS), or so, and an image processor, and carries out image recognition concerning the state of the front obstacle. The camera of the image sensor can be a stereo camera, and can include two or more cameras in another way. The image sensor determines the information indicating the relationship between the front obstacle and the own vehicle, for example, the speed and/or position information of the front obstacle with respect to the own vehicle, based on the image recognition result, in a predetermined cycle. The position information of the front obstacle can include information concerning the position (distance) of the front obstacle in the forward/backward direction of the own vehicle, and information concerning the lateral position of the front obstacle in the lateral direction (width direction). The lateral position of the front vehicle can be calculated based on the center position in the lateral directions of the collection of pixels concerning the front vehicle, or can be calculated as the range between the left-edge lateral position and the right-edge lateral position thereof. The information thus detected by the image sensor (detection result) can be transmitted to the automatic braking control part 122, for example, in a predetermined frame cycle. Note that the image processing function of the image processor (for example, the function of calculating the position of the front vehicle) can be implemented by the automatic braking control part 122.

Next, with reference to FIG. 2, an example of the functions of the ASL-ECU 14 will be described.

Figure 2:
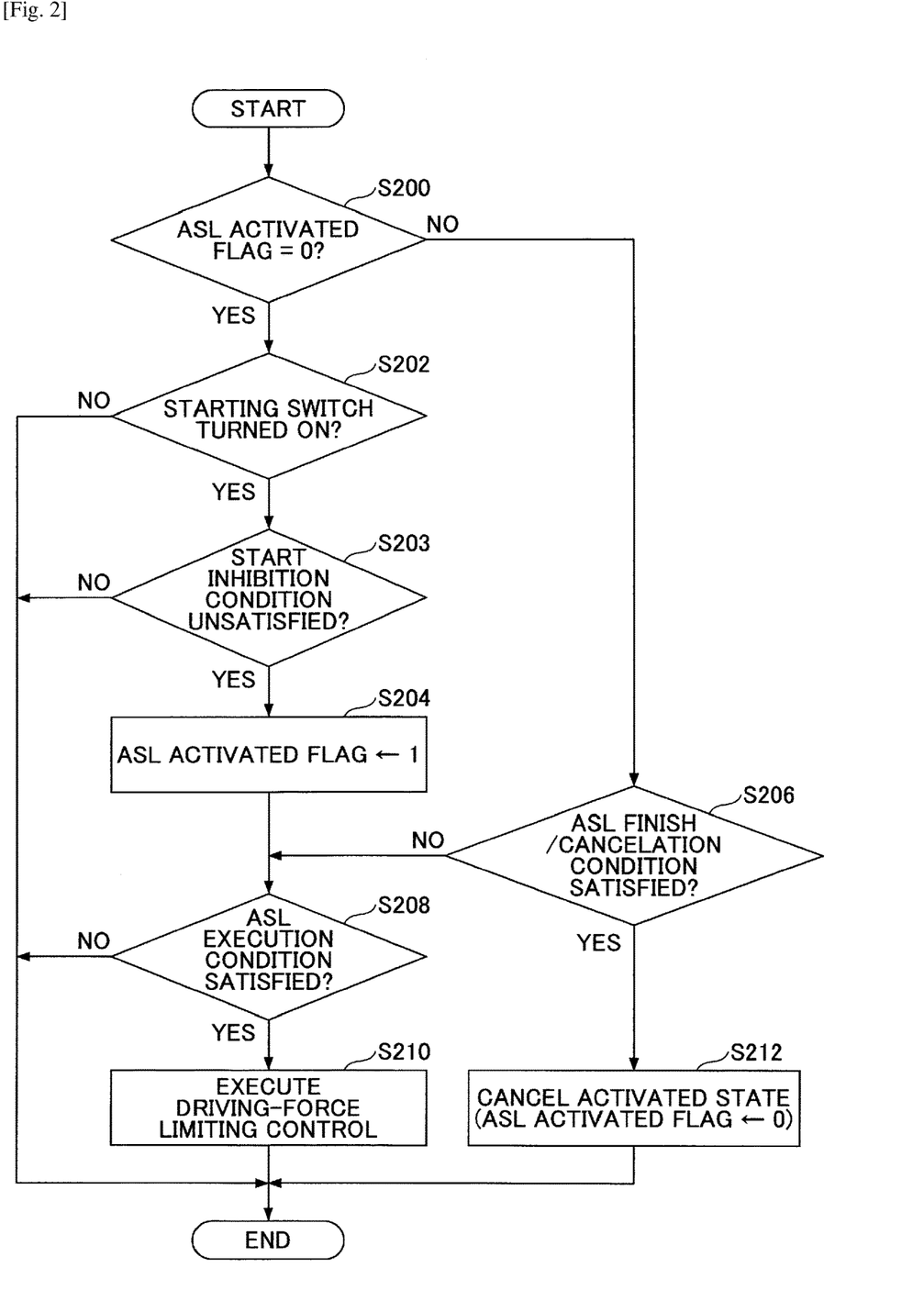
FIG. 2 is a flowchart illustrating one example of a process carried out by an ASL-ECU 14.

FIG. 2 is a flowchart illustrating one example of a process carried out by the ASL-ECU 14. The process shown in FIG. 2 is executed in every predetermined cycle repetitiously.

In step S200, the ASL-ECU 14 determines whether an ASL activated flag is "0". The ASL activated flag is a flag indicating whether the ASL-ECU 14 is in an activated state, and "1" thereof indicates that the ASL-ECU 14 is in an activated state. When the ASL activated flag is "0", the ASL-ECU 14 proceeds to step S202. When the ASL activated flag is "1", the ASL-ECU 14 proceeds to step S206.

In step S202, the ASL-ECU 14 determines whether the starting switch 15 is in a turned-on state. When the starting switch 15 is in a turned-on state, the ASL-ECU 14 proceeds to step S203. Otherwise, the ASL-ECU 14 finishes the process of the current cycle.

In step S203, the ASL-ECU 14 determines whether a predetermined start inhibition condition is not satisfied. The start inhibition condition is satisfied when, for example, a kickdown switch is in a turned-on state. The kickdown switch is turned on when the accelerator position indicated by the accelerator position information is greater than or equal to a second predetermined threshold Acc2. The second predetermined threshold Acc2 is the accelerator position when kickdown is started and is greater than the first threshold Acc1. The second predetermined threshold Acc2 can have a value, for example, near 100%. When the start inhibition condition is not satisfied, the ASL-ECU 14 proceeds to step S204. Otherwise, the ASL-ECU 14 finishes the process of the current cycle.

In step S204, the ASL-ECU 14 sets the ASL activated flag to be "1".

In step S206, the ASL-ECU 14 determines whether a predetermined ASL finish/cancellation condition is satisfied. The ASL finish/cancellation condition is satisfied when the starting switch 15 is turned off or the kickdown switch is in a turned-on state. Thus, cancellation of the activated state of the ASL-ECU 14 without the driver's acceleration intention is prevented. When the ASL finish/cancellation condition is satisfied, the ALS-ECU 14 proceeds to step S212. Otherwise, the ALS-ECU 14 proceeds to step S208.

In step S208, the ASL-ECU 14 determines whether an ASL execution condition is satisfied. The ASL execution condition is satisfied when the requted driving force calculated from the accelerator position is greater than the upper-limit driving force, as described above. When the ASL execution condition is satisfied, the ALS-ECU 14 proceeds to step S210. On the other hand, when the ASL execution condition is not satisfied, the ALS-ECU 14 finishes the process of the current cycle. In this case, the ASL-ECU 14 maintains or sets an ASL execution flag into "0". The ASL execution flag is a flag indicating whether the ASL-ECU 14 is executing the driving-force limiting control; "1" thereof means that the ASL-ECU 14 is executing the driving-force limiting control.

In step S210, the ASL-ECU 14 executes the driving-force limiting control. At this time, the ASL-ECU 14 maintains or sets the ASL execution flag into "1".

In step S212, the ASL-ECU 14 cancels the activated state, and sets the ASL activated flag into "0". Also, the ASL-ECU 14 maintains or sets the ASL execution flag into "0".

In the process shown in FIG. 2, the ASL-ECU 14 cancels the activated state when the kickdown switch is in a turned-on state, that is, the accelerator position is greater than or equal to the second predetermined threshold Acc2.

Next, with reference FIG. 3, an example of the function of the control apparatus 10 will be described.

Figure 3:
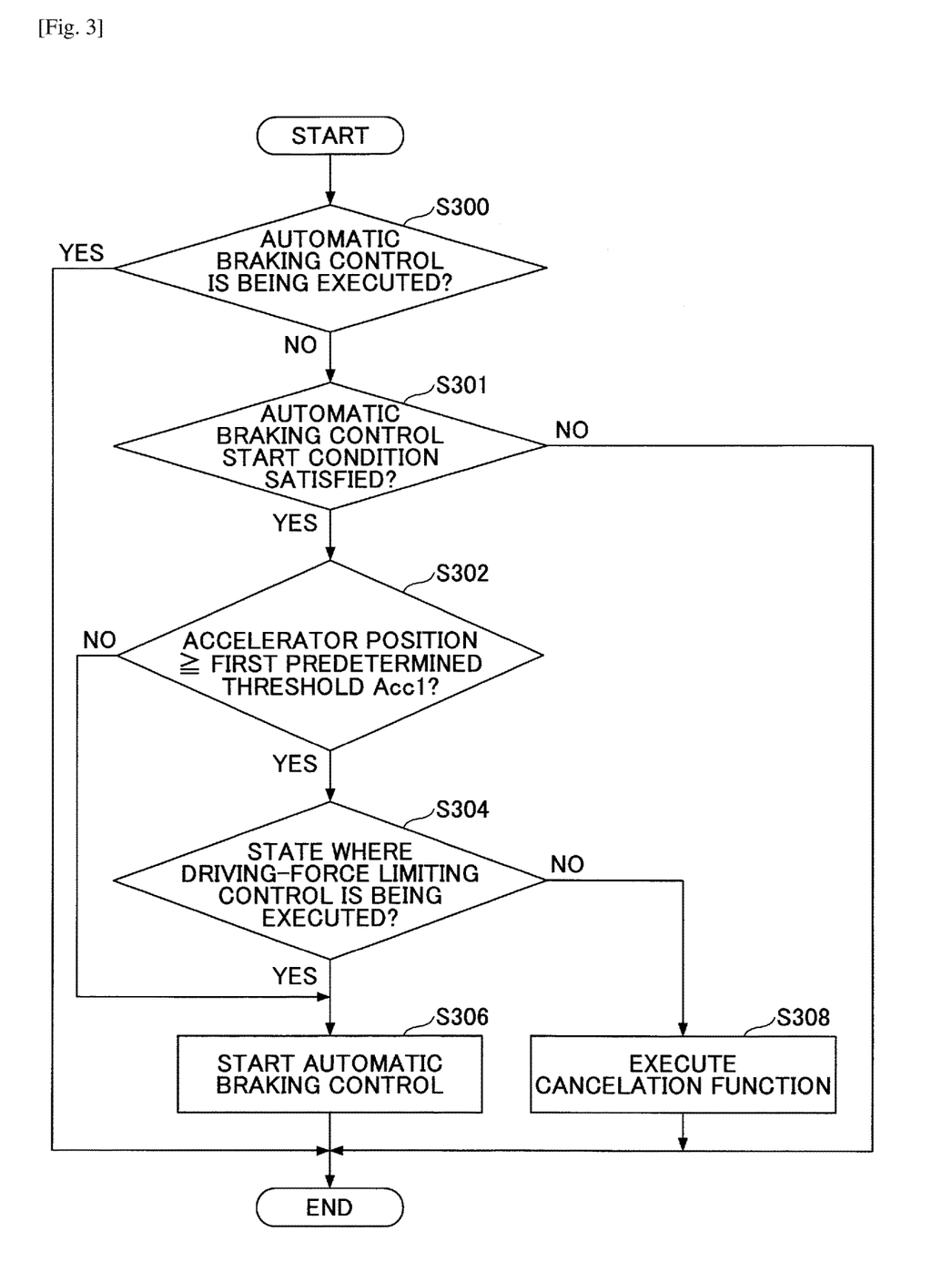
FIG. 3 is a flowchart illustrating one example of a process carried out by an arbitration part 124.

FIG. 3 is a flowchart illustrating one example of a process carried out by the control apparatus 10. The process shown in FIG. 3 is executed in every predetermined cycle repetitiously.

In step S300, the automatic braking control part 122 determines whether it is executing the automatic braking control. When the automatic braking control part 122 is executing the automatic braking control, the automatic braking control part 122 finishes the process of the current cycle. Otherwise, the automatic braking control part 122 proceeds to step S301.

In step S301, the automatic braking control part 122 determines whether the automatic braking control start condition is satisfied. When the automatic braking control start condition is satisfied, the process proceeds to step S302. Otherwise, the automatic braking control part 122 finishes the process of the current cycle.

In step S302, the arbitration part 124 determines, based on the accelerator position information acquired from the accelerator position sensor 42, whether the accelerator position is greater than or equal to the first threshold Acc1. The first threshold Acc1 can be the above-mentioned one. When determining that the accelerator position is greater than or equal to the first threshold Acc1, the arbitration part 124 proceeds to step S304. Otherwise, the arbitration part 124 proceeds to step S306, skipping over step S304.

In step S304, the arbitration part 124 determines whether the ASL-ECU 14 is executing the driving-force limiting control. For example, it is possible that the arbitration part 124 determines it based on information transmitted by the ASL-ECU 14 (for example, the ASL execution flag). When determining that the ASL-ECU 14 is executing the driving-force limiting control, the arbitration part 124 proceeds to step S306. Otherwise, the arbitration part 124 proceeds to step S308.

In step S306, the automatic braking control part 122 starts the automatic braking control. For example, the automatic braking control part 122 generates an automatic braking control request, and outputs it to the brake 30. After thus starting the automatic braking control, step S300 shown in FIG. 3 has an affirmative determination result in the subsequent process cycle. That is, the automatic braking control part 122 enters a state where it is executing the automatic braking control.

In step S308, the arbitration part 124 executes the cancellation function. That is, the arbitration part 124 inhibits a start of the automatic braking control of the automatic braking control part 122. For example, the arbitration part 124 implements the cancellation function by invalidating the automatic braking control request that is output by the automatic braking control part 122. The invalidating the automatic braking control request can be implemented in any method. For example, it is possible that the arbitration part 124 outputs such a request (for example, a flag) as to cause the automatic braking control part 122 not generate and/or output the automatic braking control request. It is also possible that the arbitration part 124 transmits such a request (for example, a flag) as to cause the brake 30 not to respond to the automatic braking control request that is output by the automatic braking control part 122 to the brake 30. After finishing step S308, the arbitration part 124 finishes the process of the current cycle.

In the process shown in FIG. 3, when the accelerator position is greater than or equal to the first threshold Acc1 (YES in step S302), a start of the automatic braking control by the automatic braking control part 122 is inhibited (step S308) under the condition where the driving-force limiting control is not being executed (NO in step S304). In other words, under the condition where the driving-force limiting control is not being executed, the cancellation function is executed (step S308). This is because, when the accelerator position is greater than or equal to the first threshold Acc1 under the condition where the driving-force limiting control is not being executed, a likelihood that the driver actually has an acceleration intention is high. Therefore, according to the process shown in FIG. 3, under the condition where the driving-force limiting control is not being executed, a likelihood of being able to inhibit a start of the automatic braking control when the driver has an acceleration intention increases, and thus, it is possible to reduce a likelihood of the driver's collision avoidance operation being obstructed due to a start of the automatic braking control.

On the other hand, according to the process shown in FIG. 3, even when the accelerator position is greater than or equal to the first threshold Acc1 (YES in step S302), the automatic braking control is started by the automatic braking control part 122 (step S306) under the condition where the driving-force limiting control is being executed (YES in step S304). That is, the automatic braking control part 122 inhibits the cancellation function from being executed under the condition where driving-force limiting control is being executed. This is because, under the condition where the driving-force limiting control is being executed, a likelihood that the driver actually does not have an acceleration intention even if the accelerator position is greater than or equal to the first threshold Acc1 is high. In more detail, under the condition where the driving-force limiting control is being executed, the vehicle is not accelerated regardless of the accelerator position. For example, under the condition where the driving-force limiting control is being executed, there is a case where the driver causes the vehicle to travel at a constant speed near the upper-limit speed under the condition where he or she is deeply stepping on the accelerator pedal (however, under the condition where the accelerator position is less than or equal to the second predetermined threshold Acc2). Thus, under the condition where the driving-force limiting control is being executed, there is a case where the accelerator position information indicating the accelerator position does not precisely represent the driver's acceleration intention. In this regard, according to the process shown in FIG. 3, even if the accelerator position is greater than or equal to the first threshold Acc1 (YES in step S302), the driver's acceleration intention in the own vehicle is negated under the condition where the driving-force limiting control is being executed (YES in step S304). Therefore, according to the process shown in FIG. 3, it is possible to reduce a likelihood of the automatic braking control being not started (in other words, a likelihood of the cancellation function being executed) based on the accelerator position although the driver has no acceleration intention under the condition where the driving-force limiting control is being executed.

Figure 4:
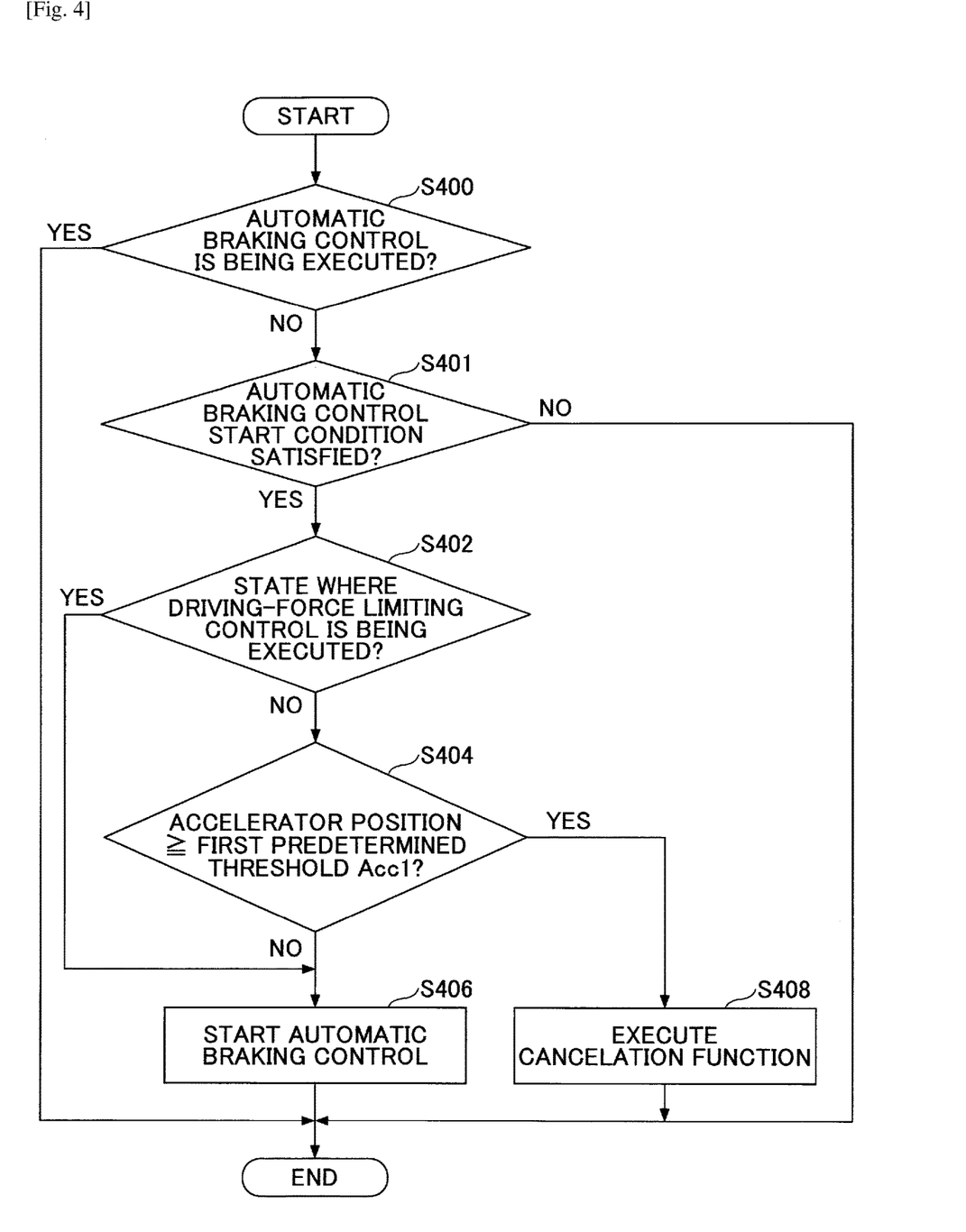
FIG. 4 is a flowchart illustrating another example of a process carried out by the arbitration part 124.

Note that, in the process shown in FIG. 3, the order can be reversed between the respective determinations in steps S302 and S304. FIG. 4 shows this variant. As shown in FIG. 4, it is also possible that the determination in step S404 corresponding to S302 in FIG. 3 is carried out when the determination in step S402 (S304) results in NO. In this case, when the determination in step S402 (S304) results in YES, the process proceeds to step S406 (S306). When the determination in step S404 (S302) results in NO, the process proceeds to step S406 (S306). When the determination in step S404 (S302) results in YES, the process proceeds to step S408 (S308).

Note that, in the variant shown in FIG. 4, under the condition where the ASL-ECU 14 is executing the driving-force limiting control (YES in step S402), it is not determined whether the accelerator position indicated by the accelerator position information is greater than or equal to the first threshold Acc1, and the automatic braking control part 122 starts the automatic braking control (step S406). Therefore, also in the variant shown in FIG. 4, the arbitration part 124 inhibits the cancellation function from being executed under the condition where the ASL-ECU 14 is executing the condition where the driving-force limiting control.

Figure 5:
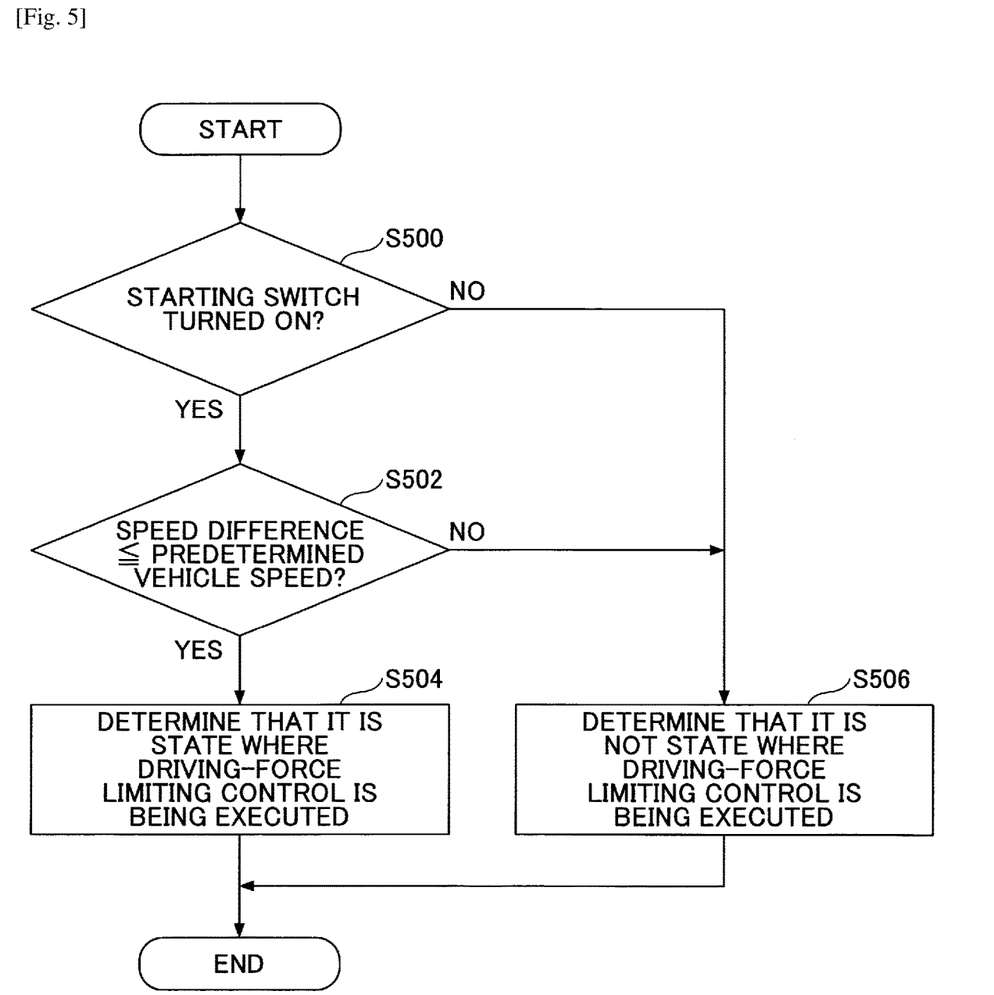
FIG. 5 is a flowchart illustrating one example of a determination method in step S304 shown in FIG. 3.

FIG. 5 is a flowchart illustrating one example of a determination method in step S304 shown in FIG. 3.

In step S500, the arbitration part 124 determines whether the starting switch 15 is in a turned-on state. When the starting switch 15 is in a turned-on state, the arbitration part 124 proceeds to step S502. Otherwise, the arbitration part 124 proceeds to step S506.

In step S502, the arbitration part 124 determines whether the difference between the speed of the own vehicle and the upper-limit speed is less than or equal to a "predetermined vehicle speed". The arbitration part 124 can acquire the upper-limit speed from the ASL-ECU 14 previously (for example, while the load of the CAN 4 is low, or so). The "predetermined vehicle speed" can be a value near the upper limit of an allowable range of the difference between the speed of the own vehicle and the upper-limit speed under the condition where the driving-force limiting control is being executed, and can be an adaptive value. When the difference between the speed of the own vehicle and the upper-limit speed is less than or equal to the predetermined vehicle speed, the arbitration part 124 proceeds to step S504. Otherwise, the arbitration part 124 proceeds to step S506.

In step S504, the arbitration part 124 determines that the ASL-ECU 14 is executing the driving-force limiting control. In this case, the determination in step S304 of FIG. 3 results in YES.

In step S506, the arbitration part 124 determines that the ASL-ECU 14 is not executing the driving-force limiting control. In this case, the determination in step S304 of FIG. 3 results in NO.

In the process shown in FIG. 5, the arbitration part 124 can carry out the determination process of step S304 even if the ASL-ECU 14 cannot transmit the ASL execution flag to the CAN 4, for example, due to the work load of the CAN 4 or so, or the ASL execution flag itself is not generated.

Note that, in the process shown in FIG. 5, it is also possible that the arbitration part 124 determines that the ASL-ECU 14 is executing the driving-force limiting control when the starting switch 15 is in a turned-on state, the accelerator position is greater than or equal to a predetermined value, and the difference between the speed of the own vehicle and the upper-limit speed is less than or equal to the predetermined vehicle speed.

Although the vehicular braking/driving control apparatus has been thus described by the embodiments, the present invention is not limited to such specific embodiments, and variations and modifications may be made without departing from the scope of the present invention. It is also possible to combine all or some of the elements of the above-described embodiments.

For example, in the example shown in FIG. 1, and FIG. 3 (also FIG. 4, in the same way hereinafter), for the sake of convenience of explanation, the PCS-ECU 12 includes the functional part that is the arbitration part 124. However, it is also possible that the function of the arbitration part 124 is incorporated into, for example, a condition for inhibiting the automatic braking control from being started (hereinafter, simply referred to as an "automatic braking control start inhibition condition"). For example, the "automatic braking control start inhibition condition" can include, in an AND manner, a first condition that the accelerator position indicated by the accelerator position information is greater than or equal to the first threshold Acc1 and a second condition that the ASL-ECU 14 is not executing the driving-force limiting control. In this case, a start of the automatic braking control is inhibited in a state where the first condition and the second condition are satisfied, that is, in a state where the accelerator position indicated by the accelerator position information is greater than or equal to the first threshold Acc1, and the ASL-ECU 14 is not executing the driving-force limiting control. On the other hand, under the condition where at least one of the first condition and the second condition is not satisfied, a start of the automatic braking control is not inhibited. Also in this case, it is possible to acquire the same advantageous effects as those of the process shown in FIG. 3.

Also, in the example shown in FIG. 1 and FIG. 3, the PCS-ECU 12 includes the arbitration part 124. However, it is also possible that some or all of the functions of the arbitration part 124 are implemented by a processor other than the PCS-ECU 12 (for example, the ASL-ECU 14, the processor inside the brake 30, or a new other processor).

For example, when the arbitration part 124 is incorporated into the ECU of the brake 30, it is possible that when arbitration part 124 executes the cancellation function (see step S308 in FIG. 3), the arbitration part 124 does not respond to the automatic braking control request that is output from the automatic braking control part 122 to the brake 30. It is also possible that when the arbitration part 124 inhibits the cancellation function from being executed (see step S306 in FIG. 3), the arbitration part 124 responds to the automatic braking control request that is output from the automatic braking control part 122 to the brake 30.

Also, for example, when the arbitration part 124 is incorporated into the ASL-ECU 14, it is possible that when the arbitration part 124 executes the cancellation function (see step S308 in FIG. 3), the arbitration part 124 transmits a request (for example, an inhibition flag) to the automatic braking control part 122 to inhibit it from generating or outputting the automatic braking control request. It is also possible that when the arbitration part 124 inhibits the cancellation function from being executed (see step S306 in FIG. 3), the arbitration part 124 transmits a request (for example, a permission flag) to the automatic braking control part 122 to allow it to transmit and/or output the automatic braking control request.

Also, in the example shown in FIG. 3, in step S302, it is determined only whether the accelerator position indicated by the accelerator position information is greater than or equal to the first threshold Acc1. However, it is not necessary to limit to such a way. It is also possible that, in addition to or instead of whether the accelerator position indicated by the accelerator position information is greater than or equal to the first threshold Acc1, it is determined whether an increasing amount of the accelerator position indicated by the accelerator position information is greater than or equal to a predetermined value, it is determined whether an increasing rate of the accelerator position indicated by the accelerator position information is greater than or equal to a predetermined rate, and/or the like. For example, it is possible that the determination in step S302 results in YES when the accelerator position indicated by the accelerator position information is greater than or equal to the first threshold Acc1, and the increasing amount of the accelerator position indicated by the accelerator position information is greater than or equal to a predetermined value.

In the above-described embodiments, it is also possible that the automatic braking control part 122 outputs an alarm together with executing the automatic braking control. In this case, it is also possible that the alarm is not inhibited in step S308. In other words, it is possible that as long as the determination in step S301 or S401 results in YES, the alarm is output even if the determination in step S302 or S404 results in NO and/or the determination in step S304 or S402 results in YES.

Further, in the example shown in FIG. 3, only the related conditions are shown. However, it is also possible that the automatic braking control start condition and/or the automatic braking control start inhibition condition are more complicated. For example, the automatic braking control start inhibition condition can include a condition that the driver is not operating the brake pedal, as an AND condition to the first condition that the accelerator position indicated by the accelerator position information is greater than or equal to the first threshold Acc1.

Also, another automatic braking control start inhibition condition that the driver is operating the steering in an emergency manner can be included. Thus, it is possible that a start of the automatic braking control is inhibited also in a state other than the state shown in FIG. 3 (the accelerator position indicated by the accelerator position information is greater than or equal to the first threshold Acc1 and the ASL-ECU 14 is not executing the driving-force limiting control). Therefore, if such another automatic braking control start inhibition condition is included, the arbitration part 124 inhibits the cancellation function from being executed under the condition where the accelerator position indicated by the accelerator position information is greater than or equal to the first threshold Acc1 and the ASL-ECU 14 is executing the driving-force limiting control, with a prerequisite that such another automatic braking control start inhibition condition is not satisfied.

In the above-described embodiments, the driving-force limiting control of limiting the driving force in order that the upper-limit speed will not be exceeded based on the upper-limit speed that is set by the driver is executed. In this regard, it is possible that the upper-limit speed is automatically set as in a case of Intelligent Speed Assistance (ISA). For example, it is possible that the upper-limit speed is automatically set based on speed limit information that can be acquired via communication from an outside-vehicle facility such as an infrastructure (including a center server) and indicates the speed limit of the road on which the vehicle is currently traveling. It is also possible that the upper-limit speed is automatically set based on speed limit information of a road sign that can be acquired through image recognition by using an on-vehicle camera or so.

Figure 6:
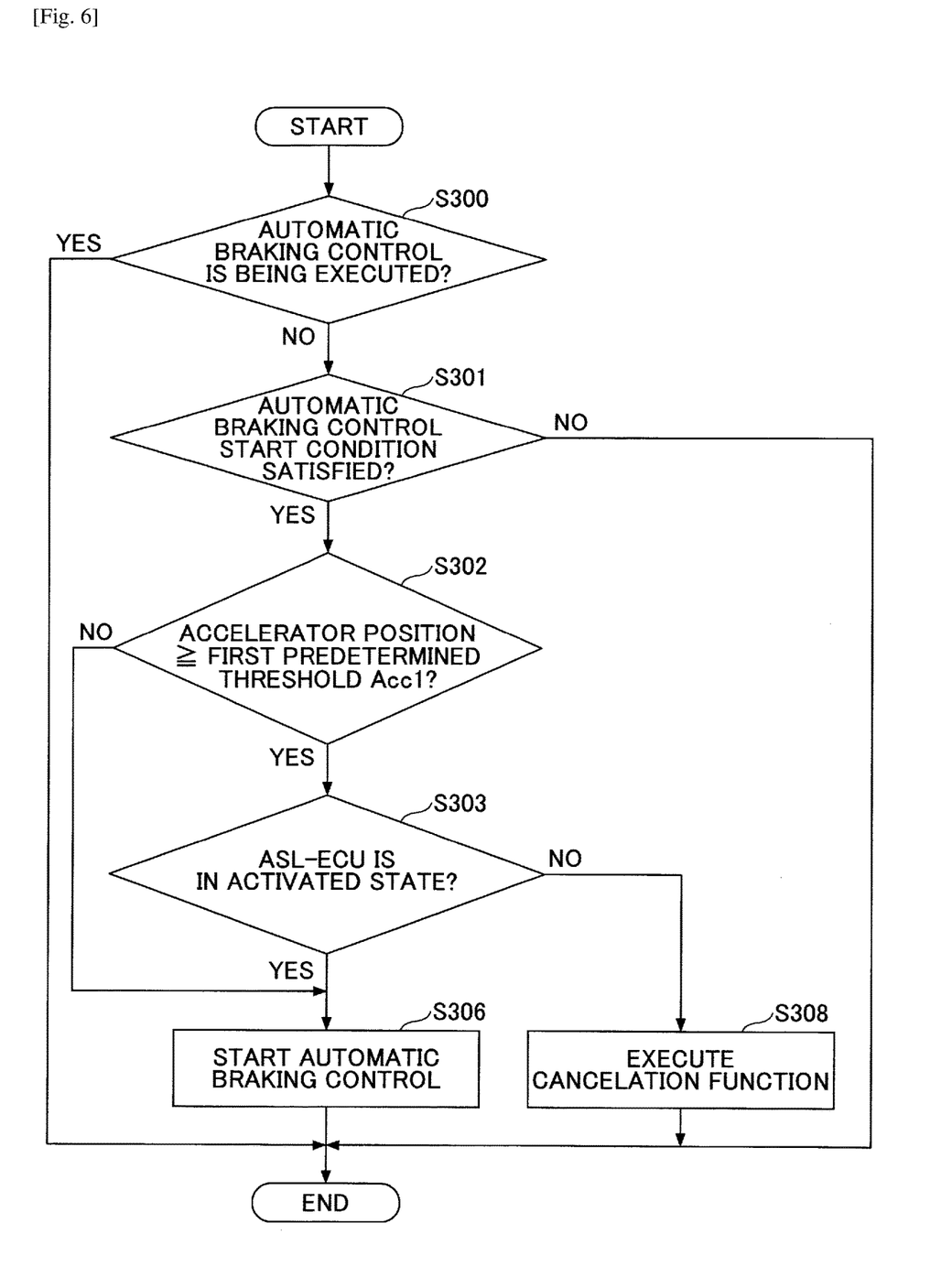
FIG. 6 is a flowchart illustrating further another example of a process carried out by the arbitration part 124.
Figure 7:
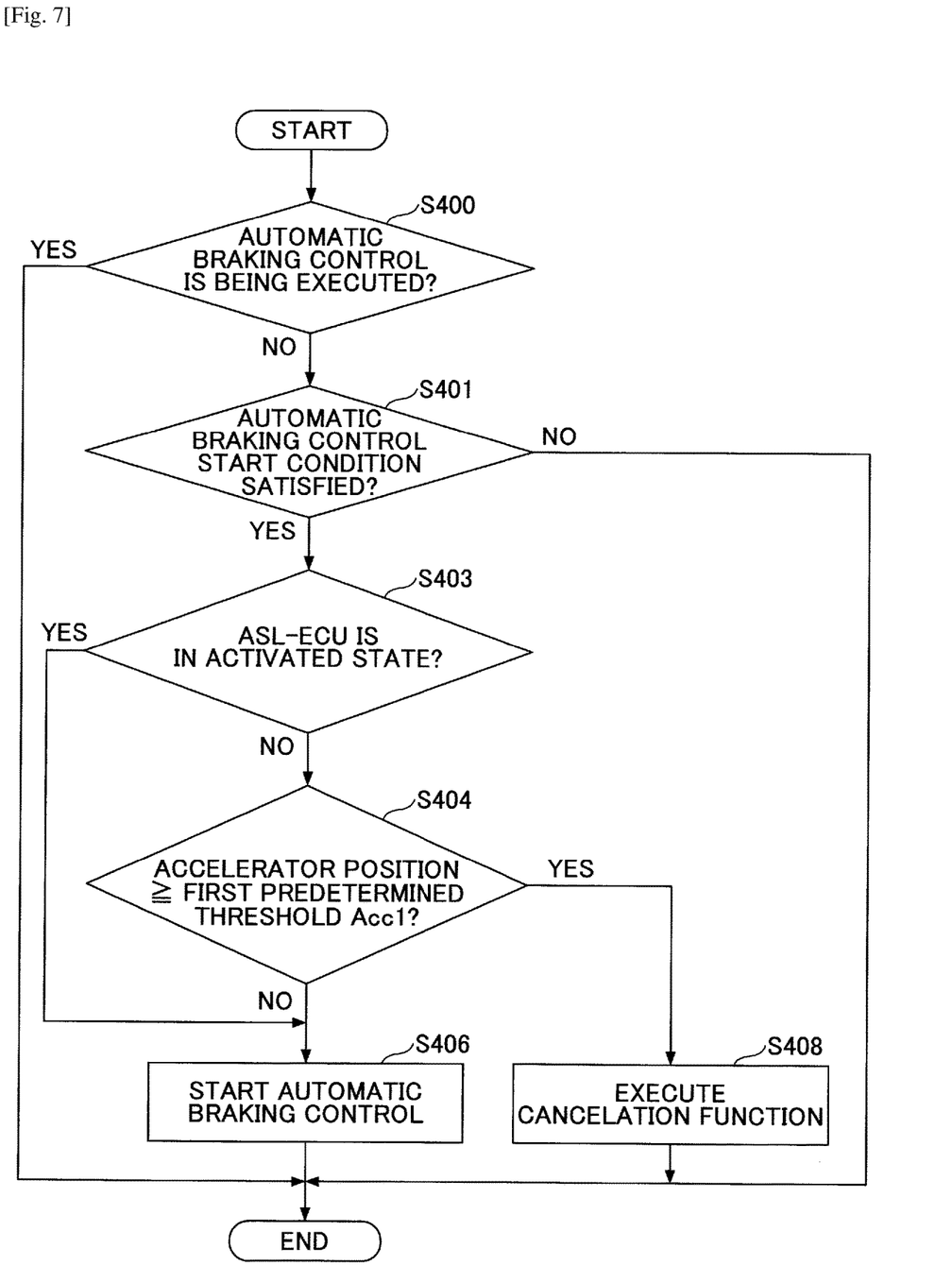
FIG. 7 is a flowchart illustrating yet another example of a process carried out by the arbitration part 124.

Further, in step S304 of FIG. 3 (also the same in step S402 of FIG. 4) in the above-described embodiments, it is determined whether the ASL-ECU 14 is executing the driving-force limiting control. However, instead, it is also possible that it is determined whether the ASL-ECU 14 is in an activated state (in step S303 shown in FIG. 6 or S403 shown in FIG. 7). FIGS. 6 and 7 show the variants, corresponding to FIGS. 3 and 4, respectively. Note that FIGS. 6 and 7 are the same as FIGS. 3 and 4 except for replacing steps S304 and S402 with steps S303 and S403, respectively. That is, it is also possible that the arbitration part 124 inhibits the cancellation function from being executed when the ASL-ECU 14 is in an activated state without regard to whether the ASL-ECU 14 is executing the driving-force limiting control. Note that it is possible that the arbitration part 124 determines that the ASL-ECU 14 is in an activated state based on a state where the ASL activated flag transmitted from the ASL-ECU 14 has the value "1" and/or the starting switch 15 is in a turned-on state. Note that a state where the ASL-ECU 14 is in an activated state includes a state where the ASL-ECU 14 is executing the driving-force limiting control (that is, the ASL-ECU 14 can execute the driving-force limiting control only in an activated state). Therefore, the above-described advantageous effects can be acquired at least partially.

Thus, according to the present disclosure, it is possible to acquire the vehicular braking/driving control apparatus by which it is possible to reduce a likelihood that the automatic braking control is not started due to the accelerator position information even if the driver has no acceleration intention under the condition where the driving-force limiting control is being executed.

The present application is based on and claims the benefit of priority of Japanese Priority Application No. 2014-212686, filed on Oct. 17, 2014, the entire contents of which are hereby incorporated herein by reference.

The invention claimed is:

1. A vehicular braking/driving-force control apparatus comprising:
    an accelerator operation detector to detect an accelerator operation; and
    one or more processors configured
        to carry out driving-force limiting control of limiting driving force of an own vehicle in such a manner that an upper-limit speed that is set will not be exceeded,
        to carry out automatic braking control of automatically generating braking force in the own vehicle based on a relative distance or a relative speed between an obstacle in front of the own vehicle and the own vehicle,
    wherein the one or more processors are further configured to permit carrying out of the automatic braking control when the driving-force limiting control is being carried out and an intention of accelerating the own vehicle is not clear based on the accelerator operation, and
    wherein the one or more processors are further configured to cancel a start of the automatic braking control when the driving-force limiting control is not being carried out and the intention of accelerating is clear based on the accelerator operation.

2. The vehicular braking/driving-force control apparatus as claimed in claim 1, wherein
    the one or more processors are further configured to, when the driving-force limiting control is being carried out, the automatic braking control is carried out.

3. The vehicular braking/driving-force control apparatus as claimed in claim 2, wherein
    the one or more processors are further configured to, when a starting switch is in a turned-on state and a difference between a speed of the own vehicle and the upper-limit speed is less than or equal to a predetermined vehicle speed, determine that the driving-force limiting control is being carried out.

4. The vehicular braking/driving-force control apparatus as claimed in claim 1, wherein
    the accelerator operation corresponds to an accelerator pedal stepped-on amount,
    the start of the automatic braking control is canceled when the accelerator pedal stepped-on amount is greater than or equal to a first predetermined threshold, and
    the one or more processors are further configured to cancel being able to carry out the driving-force limiting control when the accelerator pedal stepped-on amount is greater than or equal to a second predetermined threshold greater than the first predetermined threshold.

5. The vehicular braking/driving-force control apparatus as claimed in claim 2, wherein
    the accelerator operation corresponds to an accelerator pedal stepped-on amount,
    the start of the automatic braking control is canceled when the accelerator pedal stepped-on amount is greater than or equal to a first predetermined threshold, and
    the one or more processors are further configured to cancel being able to carry out the driving-force limiting control when the accelerator pedal stepped-on amount is greater than or equal to a second predetermined threshold greater than the first predetermined threshold.

6. The vehicular braking/driving-force control apparatus as claimed in claim 3, wherein
    the accelerator operation corresponds to an accelerator pedal stepped-on amount,
    the start of the automatic braking control is canceled when the accelerator pedal stepped-on amount is greater than or equal to a first predetermined threshold, and the one or more processors are further configured to cancel being able to carry out the driving-force limiting control when the accelerator pedal stepped-on amount is greater than or equal to a second predetermined threshold greater than the first predetermined threshold.

7. The vehicular braking/driving-force control apparatus as claimed in claim 4, wherein
the start of the automatic braking control is canceled when the accelerator pedal stepped-on amount is greater than or equal to the first predetermined threshold under the condition where the driving-force limiting control is not being carried out, whereas
under the condition where the driving-force limiting control is being carried out, the automatic braking control is started even when the accelerator pedal stepped-on amount is greater than or equal to the first predetermined threshold.

8. The vehicular braking/driving-force control apparatus as claimed in claim 5, wherein
the start of the automatic braking control is canceled when the accelerator pedal stepped-on amount is greater than or equal to the first predetermined threshold under the condition where the driving-force limiting control is not being carried out, whereas
under the condition where the driving-force limiting control is being carried out, the automatic braking control is started even when the accelerator pedal stepped-on amount is greater than or equal to the first predetermined threshold.

9. The vehicular braking/driving-force control apparatus as claimed in claim 6, wherein
the start of the automatic braking control is canceled when the accelerator pedal stepped-on amount is greater than or equal to the first predetermined threshold under the condition where the driving-force limiting control is not being carried out, whereas
under the condition where the driving-force limiting control is being carried out, the automatic braking control is started even when the accelerator pedal stepped-on amount is greater than or equal to the first predetermined threshold.

10. The vehicular braking/driving-force control apparatus as claimed in claim 4, wherein
the start of the automatic braking control is canceled when a plurality of predetermined automatic braking control inhibition conditions are satisfied, wherein
the predetermined automatic braking control inhibition conditions include a first condition that the accelerator pedal stepped-on amount is greater than or equal to the first predetermined threshold and a second condition that the driving-force limiting control is not being carried out.

11. The vehicular braking/driving-force control apparatus as claimed in claim 5, wherein
the start of the automatic braking control is canceled when a plurality of predetermined automatic braking control inhibition conditions are satisfied, wherein
the predetermined automatic braking control inhibition conditions include a first condition that the accelerator pedal stepped-on amount is greater than or equal to the first predetermined threshold and a second condition that the driving-force limiting control is not being carried out.

12. The vehicular braking/driving-force control apparatus as claimed in claim 6, wherein
the start of the automatic braking control is cancelled when a plurality of predetermined automatic braking control inhibition conditions are satisfied, wherein
the predetermined automatic braking control inhibition conditions include a first condition that the accelerator pedal stepped-on amount is greater than or equal to the first predetermined threshold and a second condition that the driving-force limiting control is not being carried out.

13. The vehicular braking/driving-force control apparatus as claimed in claim 7, wherein
the start of the automatic braking control is cancelled when a plurality of predetermined automatic braking control inhibition conditions are satisfied, wherein
the predetermined automatic braking control inhibition conditions include a first condition that the accelerator pedal stepped-on amount is greater than or equal to the first predetermined threshold and a second condition that the driving-force limiting control is not being carried out.

14. The vehicular braking/driving-force control apparatus as claimed in claim 8, wherein
the start of the automatic braking control is cancelled when a plurality of predetermined automatic braking control inhibition conditions are satisfied, wherein
the predetermined automatic braking control inhibition conditions include a first condition that the accelerator pedal stepped-on amount is greater than or equal to the first predetermined threshold and a second condition that the driving-force limiting control is not being carried out.

15. The vehicular braking/driving-force control apparatus as claimed in claim 9, wherein
the start of the automatic braking control is cancelled when a plurality of predetermined automatic braking control inhibition conditions are satisfied, wherein
the predetermined automatic braking control inhibition conditions include a first condition that the accelerator pedal stepped-on amount is greater than or equal to the first predetermined threshold and a second condition that the driving-force limiting control is not being carried out.

16. The vehicular braking/driving-force control apparatus as claimed in claim 1, wherein
the accelerator operation corresponds to an accelerator pedal stepped-on amount, and
the start of the automatic braking control is canceled when the accelerator pedal stepped-on amount is greater than or equal to a first predetermined threshold in a state of not carrying out the driving-force limiting control.

* * * * *